(12) United States Patent
Ring

(10) Patent No.: US 9,311,600 B1
(45) Date of Patent: Apr. 12, 2016

(54) METHOD AND SYSTEM FOR MAPPING STATES AND ACTIONS OF AN INTELLIGENT AGENT

(71) Applicant: Mark Bishop Ring, Anaheim, CA (US)

(72) Inventor: Mark Bishop Ring, Anaheim, CA (US)

( * ) Notice: Subject to any disclaimer, the term of this patent is extended or adjusted under 35 U.S.C. 154(b) by 171 days.

(21) Appl. No.: 13/907,936

(22) Filed: Jun. 2, 2013

Related U.S. Application Data

(60) Provisional application No. 61/654,918, filed on Jun. 3, 2012.

(51) Int. Cl.
*G06N 5/02* (2006.01)
*G06N 99/00* (2010.01)

(52) U.S. Cl.
CPC ............... *G06N 5/02* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,040,214 A | 8/1991 | Grossberg et al. | |
| 6,654,730 B1 | 11/2003 | Kato et al. | |
| 6,738,753 B1 | 5/2004 | Hogan | |
| 6,952,688 B1 | 10/2005 | Goldman et al. | |
| 7,035,467 B2 | 4/2006 | Nicponski | |
| 7,296,005 B2 | 11/2007 | Minamino et al. | |
| 7,346,595 B2 | 3/2008 | Aoyama et al. | |
| 7,539,656 B2 | 5/2009 | Fratkina et al. | |
| 7,814,038 B1 | 10/2010 | Repici | |
| 7,953,675 B2 * | 5/2011 | Medioni et al. | 706/12 |
| 7,979,364 B2 | 7/2011 | Hidai et al. | |
| 8,112,369 B2 | 2/2012 | Abramson | |
| 2004/0086185 A1 | 5/2004 | Sun | |
| 2005/0108453 A1 | 5/2005 | Maturana et al. | |
| 2010/0117978 A1 * | 5/2010 | Shirado | 345/173 |
| 2011/0194768 A1 * | 8/2011 | Handley et al. | 382/171 |

OTHER PUBLICATIONS

"The Two-Dimensional Organization of Behavior", M. Ring, T. Schaul, J. Schmidhuber, Proceedings of the First Joint Conference on Developmental Learning and on Epigenetic Robitcs, 2011, 8 pages.*
"A sensorimotor Map: modulatin gLateral Interactions for Anticipation and Planning", Marc Toussaint, Neural Computation 18, 2006, pp. 1132-1155.*

* cited by examiner

*Primary Examiner* — Ben Rifkin
*Assistant Examiner* — Mai T Tran
(74) *Attorney, Agent, or Firm* — Innovation Capital Law Group, LLP; Vic Lin

(57) ABSTRACT

A method and system comprise providing means and method for producing, modifying, and/or exploiting the structure of a policy manifold. Each of the policies at least comprises information for mapping state and/or sensory information as input to action preferences as output. One or more processing units assign each of the policies a policy coordinate on a policy manifold. The policy coordinate may in part be determined by a dissimilarity matrix or other means for organizing the coordinates of the policies on the policy manifold according to the properties of the policies and the topology of the policy manifold. The policy manifold comprises a dimensionality that is lower than a combined dimensionality of the input and the output, wherein the policy manifold at least in part determines a behavior of the intelligent artificial agent.

16 Claims, 13 Drawing Sheets

METHOD AND SYSTEM FOR MAPPING STATES AND ACTIONS OF AN INTELLIGENT AGENT

CROSS-REFERENCE TO RELATED APPLICATIONS

The present Utility patent application claims priority benefit of the [U.S. provisional application for patent Ser. No. 61/654,918 entitled "SYSTEM FOR THE ORGANIZATION OF THE BEHAVIORS (POLICIES) OF AN INTELLIGENT ARTIFICIAL AGENT" filed on 3 Jun. 2012, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to intelligent artificial agents. More particularly, the invention relates to mapping of states and actions of intelligent artificial agents.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Intelligent control systems for artificial intelligent agents provide improved ability to control such agents. However, many currently known systems may exhibit a variety of issues, such as brittleness and poor generalization, to name two of many.

By way of educational background, another aspect of the prior art generally useful to be aware of is that one currently known solution shows a learning control apparatus including a grouping unit for grouping at least one variable into a variable group in accordance with an estimated causal relationship, a determining unit for determining a behavior variable corresponding to each variable group, and a layering unit for layering, in accordance with variable groups and behavior variables. Another known solution teaches of a population of agents seeded with cognitive map variants characterizing different cultures or different affiliation, modifications including modification to weights of the cognitive map and structure of the cognitive map of a global best in a neighborhood imitated according to a weighted random selection based on commonality of node characteristic in the neighborhood. Yet another known solution discloses of a method for multiple cue integration based on a plurality of objects comprising the following steps: deriving a relationship of a plurality of objects as distance graphs and distance matrices based on a plurality of object cues; and optimizing integration of distance graphs and distance matrices by minimizing a distance between ideal transition probability matrix and transition matrix derived from cue integration. However, these solutions may not effectively organize the multiple and related behaviors of artificial intelligent agent systems. A solution which allowed access to policies within a space and allowed for organization of that space according to properties of policies would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF SOME EMBODIMENTS

Figure 1:
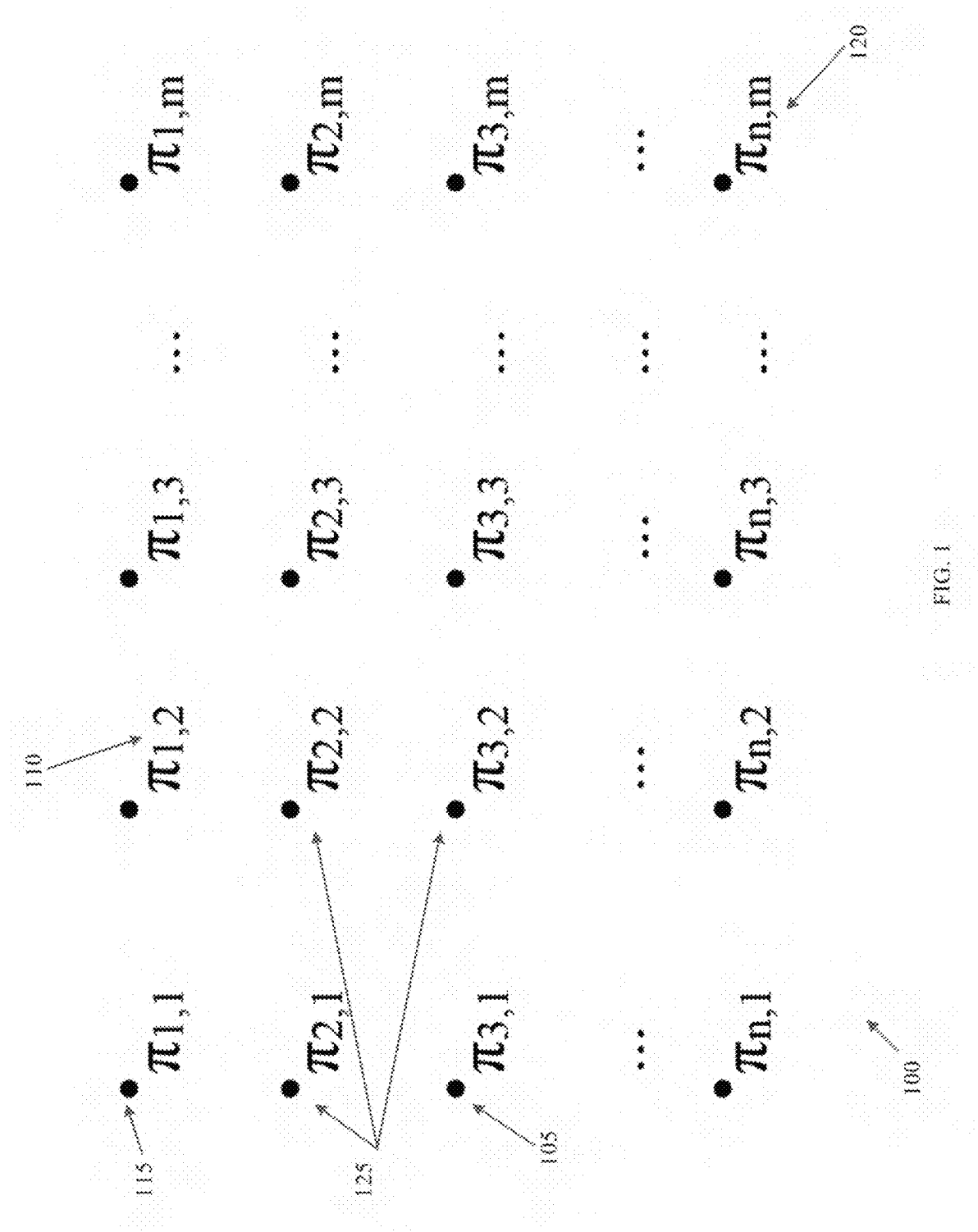
FIG. 1 illustrates an exemplary policy manifold for organizing policies, in accordance with an embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a microcomputer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device. A "computing platform" may comprise one or more processors.

The term "robot" may refer to any system controlled directly or indirectly by a computer or computing system that issues actions or commands in response to senses or observations. The term may refer without limitation to a traditional physical robot with physical sensors such as cameras, touch sensors, range sensors, etc., or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer-readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Many practical embodiments of the present invention provide means and methods for efficient performance of activities by an artificial intelligent agent.

The term "agent" or "intelligent agent" or "artificial agent" or "artificial intelligent agent" is meant to refer to any manmade entity that chooses actions in response to observations. "Agent" may refer without limitation to a robot, to a simulated robot, to a software agent or "bot", an adaptive agent, an internet or web bot.

The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about agent's action(s) may include, without limitation, a probability distribution over agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

The term "surface" or "grid" refers here to a low-dimensional space or surface or manifold. The surface consists of a (possibly unlimited) set of points. Every point in the surface has a unique coordinate with the same dimensionality as the surface (e.g., if the surface is two-dimensional, each coordinate will consist of two values). The surface may be continuous, where each dimension of each coordinate may be specified as a real or fractional or complex value, or the surface may be discrete, where each dimension of each coordinate may be specified as an integer value. A surface may have any topology, including, without limitation, flat, smooth, or gridlike. A surface may be curved or take any angle and/or shape, including without limitation a rectangle, triangle, polygon, polyhedron, circle, torus, any higher-dimensional version(s) of these, including a cube, sphere, hypercube, hypersphere, hypertorus, etc.

The term "distance" refers specifically to the space between two points on a surface as determined by a convenient metric, such as, without limitation, Euclidean distance or Hamming distance. Two points or coordinates are "close" or "nearby" when the distance between them is small.

The term "policy manifold" refers to a surface according to the present invention, where each point in/on the surface may be associated with a policy, such that each such associated policy may have a coordinate in/on the surface.

Many practical embodiments of the present invention may provide means and method for producing, modifying, and/or exploiting the structure of a policy manifold. Many embodiments take a set of policies and associate with each policy a coordinate in/on a surface thus creating a policy manifold.

Many embodiments of the present invention may organize the policies in the policy manifold according to both (a) the properties of the policies and (b) their coordinates and/or the distances between their coordinates in the policy manifold.

The terms "dissimilarity" or "policy dissimilarity" refer to a comparison between two policies with respect to a chosen property according to a chosen metric by which a difference between the two policies can be computed. Depending on the chosen metric, "dissimilarity" can refer to any such measurable property. The smaller the difference between the two policies according to the chosen metric, the less their dissimilarity. In a non-limiting example, the metric might compare the actions produced by each policy given the same state information, yielding a high value if the actions are on average very different and yielding a low value if the actions on average are very similar (where similarity is measured in a way appropriate for the properties of the actions). In another non-limiting example, if the policies are both described as probability distributions, the metric might measure the KL divergence between them. In another non-limiting example, the metric may measure partial aspects of the policy, such as expected or desired likelihood of producing a certain action or trajectory, expected or desired likelihood of visiting a certain set of states, expected or desired termination condition, expected or desired results of following the policy, or expected or desired performance with respect to a particular metric.

Many embodiments of the invention may organize the policies of a policy manifold such that the distances between their coordinates generally reflect their dissimilarities. Some embodiments may attempt to organize them such that all dissimilarities between all pairs of policies are reflected as well as possible in their corresponding distances on the policy manifold. Other embodiments may attempt to organize them such that some dissimilarities are given greater weight than others.

In some embodiments, multiple policies might be associated with the same coordinate of policy manifold. In some embodiments, a single policy may be associated with multiple coordinates of the same policy manifold or different policy manifolds within the same agent.

The term "learning update" may refer to the modification of a policy or to a policy's associated coordinate. This modification may improve the agent's performance or effectiveness. A learning update applied to a single policy may modify the policy so as to produce a better mapping from state information to action information. A single learning update applied to multiple policies may modify those policies in similar but not necessarily identical ways. In a non-limiting example, the learning update may modify all policies receiving the update by moving them in the same direction in policy space, or in another non-limiting example by moving them towards the same point in policy space or toward the same target output for a specific input or set of inputs. If the learning update applies to the policy's coordinate, it may modify that policy's coordinate in a policy manifold. In a non-limiting example, a learning update may move a policy's associated coordinate a constant or variable amount in a particular direction. In another non-limiting example, a learning update may move a policy's associated coordinate a constant or variable amount towards a chosen coordinate or policy in a policy manifold.

The terms "neighbor," "neighbors," "neighborhood," and "neighboring" refer to a set of policies or coordinates in a policy manifold that meet a chosen distance relationship to a given coordinate or set of coordinates or to the coordinate associated with a given policy or set of policies. In one non-limiting example, the term may refer to a specific, predetermined number of coordinates or policies closest in a policy manifold to a given policy or coordinate. In another non-limiting example, the term may refer to all coordinates or policies less than a specific distance from a given coordinate or a given policy in a policy manifold. In another non-limiting example, the term may refer to a set of policies randomly drawn according to a probability distribution whose probabilities are determined as a function of each policy's distance on a policy manifold to a given coordinate or to the coordinate of a given policy.

FIG. 1 illustrates an exemplary policy manifold for organizing policies, in accordance with an embodiment of the present invention. In the present embodiment, a two-dimensional surface 100 may contain a group of points some or all of which are each associated with a policy 105. In many embodiments, coordinates 110 of any given policy 105 may change over time and/or the mapping represented by a policy 105 may change over time. In the present embodiment, a policy manifold having the topology of a discrete n×m grid 100 may have coordinates 110 which range from (1,1) in one corner 115 to (n,m) in an opposite corner 120. In some embodiments, a policy 105 may define a behavior of an intelligent artificial agent, policy 105 being a mapping from information about agent's state to information about agent's action(s). In many embodiments, policies 105 may be trained with any appropriate learning or teaching method, including, without limitation, reinforcement-learning method or control optimization method. In some of these embodiments, suitable reinforcement-learning methods may include, without limitation, TD or GTD methods, Q-learning or GQ methods, sarsa, or actor-critic methods. In some embodiments, the policies and/or their coordinates in the policy manifold can be modified so as to produce "smoothness". A policy manifold shows greater smoothness when dissimilarity between policies tends to be small between policies whose coordinates in the policy manifold are close (i.e., have small distance). Conversely, the policy manifold is less smooth if policies tend to be more similar to distant policies than to nearby policies. In some embodiments, to produce smoothness in a policy manifold 100, when applying a learning update to a policy 105, one may also apply the learning update to the policy's 105 neighbors 125 in the policy manifold 100. As a non-limiting example, policy $\pi$ may be associated with coordinate C on policy manifold 100. Policy $\pi$ may be trained to encode the reaching of the endpoint of a robotic arm towards a point in space; if during training, learning updates are applied to it alone, then only it would learn this policy and $\pi$'s neighbors 125 in the policy manifold 100 would likely be substantially different from $\pi$, thus resulting in a policy manifold 100 with little smoothness. If the same or substantially similar learning updates applied to it are also applied to $\pi$'s neighbors in the policy manifold 100, then the policies encoded by these neighbors will consequently become more similar to $\pi$, thereby improving the smoothness of the policy manifold 100.

In some embodiments, policies 105 may be laid out within any low-dimensional discrete surface or grid 100 (e.g. 2, 3, or 4 dimensions). In a non-limiting example, points in a three-dimensional grid may range from (1,1,1) in one corner to (l,m,n) in an opposite corner. In another non-limiting example, points in a four-dimensional grid may range from (1,1,1,1) in one corner to (k,l,m,n) in an opposite corner.

In other embodiments, policies 105 may be laid out within a non-rectangular grid. In a non-limiting example, points in the grid may describe a circle, a sphere, a torus, or other space, surface or manifold.

In other embodiments, policies 105 may not need to be fixed in a grid 100. In some of these embodiments, policies 105 may be mobile, moving across any continuous or discrete surface. In some embodiments in which policies 105 may be mobile, mobility of policies 105 may improve smoothness of the policy manifold 100. In a non-limiting example in which policies 105 may be mobile, policies 105 with smaller dissimilarity may be moved closer to each other. In the present non-limiting example, learning updates may include, without limitation, a change in a policy's 105 coordinates such that policy may be closer to policies 105 with less dissimilarity.

In some embodiments, coordinates 110 may allow access to a policy 105 based at least in part on the policy's 105 location in policy manifold. Further, in some embodiments, the policy manifold may provide a metric for measuring distances between policies 105 according to distance between coordinates 110 of policies 105. In many embodiments, policies 105 may be organized in policy manifold 100 such that policies 105 with smaller dissimilarity may have coordinates close to each other. In some of these embodiments, such organization may allow dissimilarity between policies 105 to be estimated according to distance (on policy manifold 100) between coordinates 110 of corresponding policies 105. In a non-limiting example, similarity between policies 105 may be measured by likelihood of producing a similar output when given a similar input. In another non-limiting example, for any given policy $\pi 1$ whose coordinate 110 in policy manifold may be C1, other policies 105 $\pi 1$ whose coordinates 110 Ci may be close to C1 may tend to be less dissimilar to $\pi$ than polices 105 $\pi j$ having coordinates 110 Cj more distant to C1. Further, in the present non-limiting example, policies 105 $\pi j$ being less dissimilar to $\pi 1$ may tend to have coordinates 110 Ci that may be closer to C1 than coordinates 110 Cj of policies 105 $\pi j$ which may be less similar to $\pi 1$.

In a non-limiting example, a library of different policies 105 may function to perform a behavior such as grasping by a limbed robot. In the present non-limiting example, different policies may be enabled to handle different kinds of grasps for different kinds of objects, including, without limitation, heavy, light, wide, or narrow objects, or objects with or without handles, etc. Further, in the present non-limiting example, a region of policies 105 may produce a generic arm movement and hand closure in a vicinity of an object, while a subset of policies 105 within the region may perform a grasp of a cup or glass, or a particular ball or piece of clothing, etc. Still further, in the present non-limiting example, an even more focused region might produce a grasp dedicated to a specific type of glass, such as, without limitation, an empty wine glass.

In some embodiments, certain policies 105 may not be available in all situations. In some of these embodiments, an individual policy 105 may only be applicable in some specified part of an agent's overall sensorimotor/policy space. In some embodiments, each policy 105 may be a mapping valid within a set of related states which may tend to be temporally proximal in an agent's experience.

In many embodiments of the present invention, method steps may be executed either in a single sequence or in a continuing cycle in which order of events may not be relevant. In some embodiments, learning may or may not be a part of a process. In a non-limiting example, policies 105 may have previously been created and/or may be created, destroyed, and/or adapted/updated in frequent or infrequent intervals.

Figure 2:
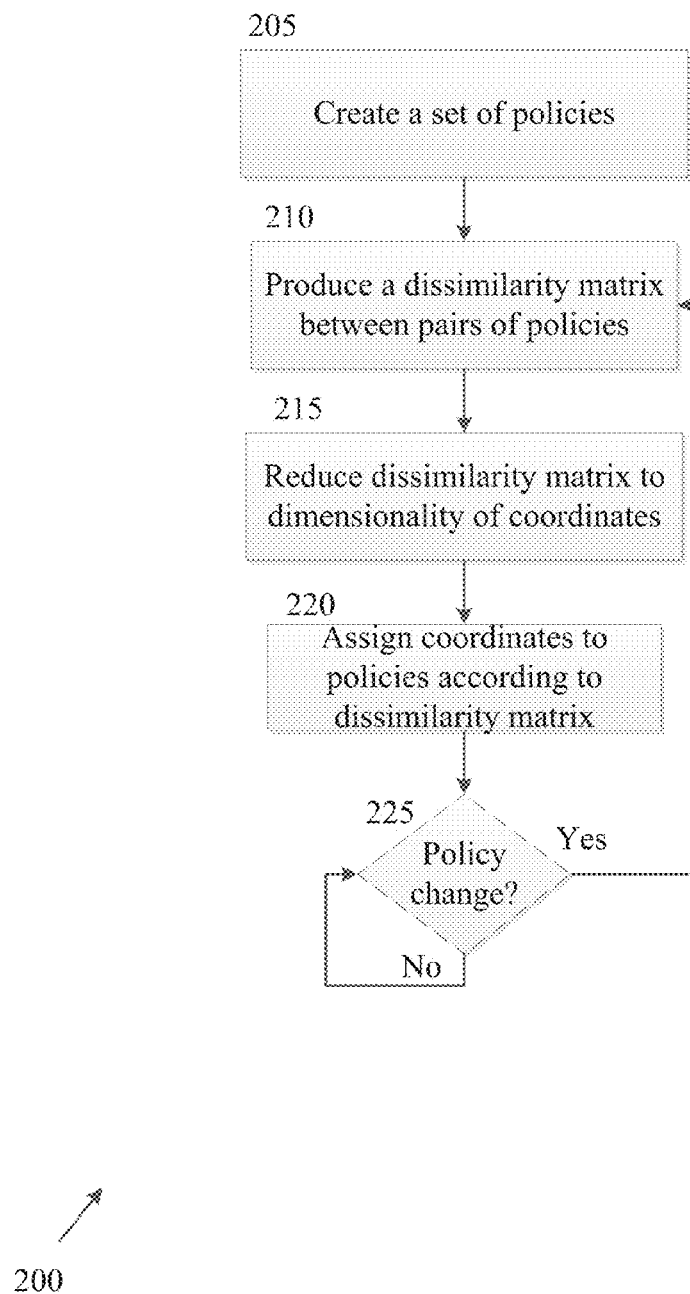
FIG. 2 illustrates an exemplary method for organizing policies 105 of an intelligent artificial agent, in accordance with an embodiment of the present invention.

FIG. 2 illustrates an exemplary method for organizing policies 105 of an intelligent artificial agent, in accordance with an embodiment of the present invention. In the present embodiment, one may create a set of policies 105 (generated randomly or through some other means) in a step 205. In some embodiments, policies 105 may be implemented in a table. In some of these embodiments, table entries represent the probability of choosing a specific action given a particular piece of state information. In these embodiments, random policies can be generated by assigning random probabilities to these entries. In other embodiments, policies 105 may be implemented by a function approximator. In some of these embodiments, the function approximator may be a neural network. In these embodiments, random policies may be generated by giving each weight in the network an initial random value drawn from a desired distribution. In the present embodiment, one may produce a dissimilarity matrix between pairs of policies 105 in a step 210. In some embodiments, dissimilarity matrix may reflect dissimilarity of pairs of policies 105 with respect to a measured property. In some embodiments, one may produce dissimilarity matrix by comparing policies 105 pairwise with respect to a property of interest and computing dissimilarity between each pair. In a non-limiting example, for each pair of policies 105, one may iterate through all possible inputs, keeping a count of how often each pair may generate the same output. In another non-limiting example, one may keep track during the agent's interaction with its environment the probability that each policy produces the same output given the current state information at each step. In the present embodiment, one may reduce dissimilarity matrix to the dimensionality of coordinates in a step 215. In some embodiments, one may use any projection or dimensionality-reduction method, such as, without limitation, any existing or newly devised multi-dimensional scaling (MDS) method, cluster-analysis method, non-linear dimensionality reduction (NLDR) method, etc., chosen as appropriate for the desired application. In a non-limiting example in which dimensionality of policy manifold may be two-dimensions, one may project dissimilarity matrix onto a plane or other two-dimensional surface in a step 215, such that, in the present embodiment, each policy 105 is assigned to a coordinate 110 in a step 220. In the present embodiment, system may determine whether policies 105 may have changed in an optional step 225. If policies 105 change, process may be repeated from step 210 for changed policies 105. Step 225 may take into account the policy's previous coordinates when assigning new coordinates. As a non-limiting example, policies may change due to learning updates during training and/or during the agent's normal interaction with its environment. If policies 105 remain unchanged, system may re-check for changes.

Figure 3:
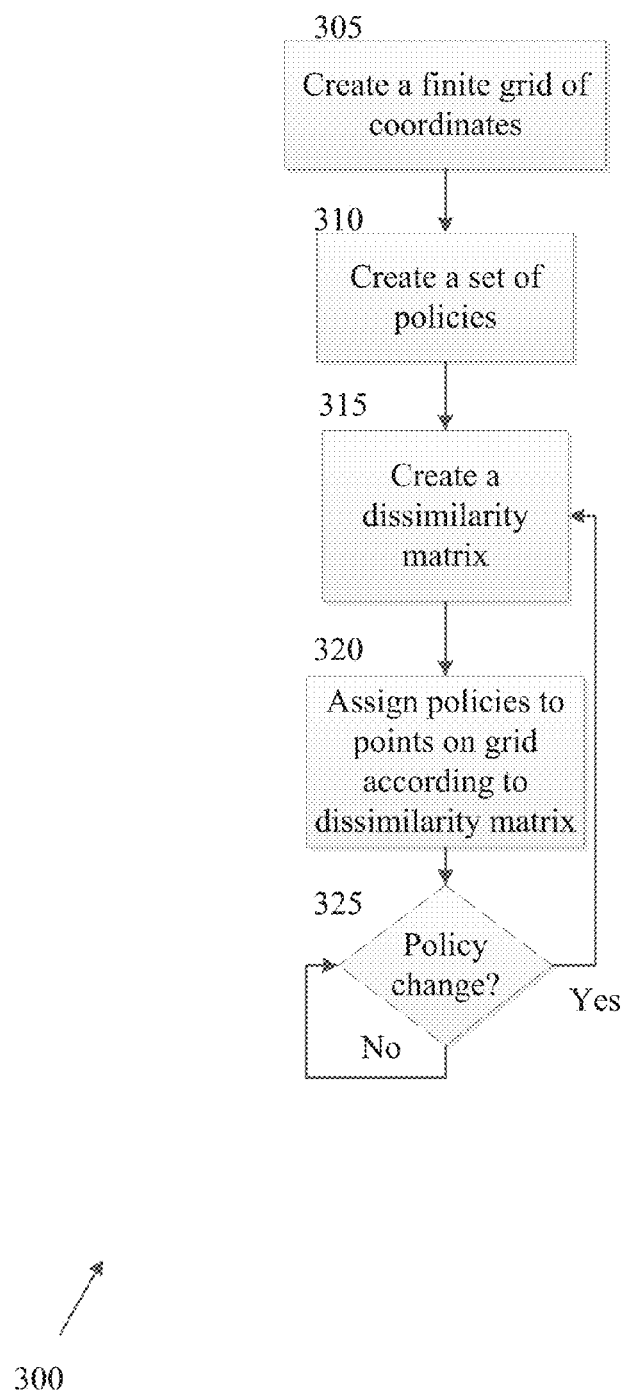
FIG. 3 illustrates an exemplary method for organizing policies 105 through use of a policy manifold having the topology of a discrete grid 100, in accordance with an embodiment of the present invention.

FIG. 3 illustrates an exemplary method for organizing policies 105 through use of a policy manifold laid out as a discrete grid 100, in accordance with an embodiment of the present invention. In the present embodiment, one may create a finite grid 100 of coordinates 110 on a surface in a step 305. In some embodiments, coordinates 110 may be evenly spaced. In the present embodiment, one may create a set of policies 105 in a step 310. In some embodiments, one may use any mechanism, including a learning mechanism, to create a set of policies 105. In the present embodiment, one may create a dissimilarity matrix in a step 315. In some embodiments, one may measure dissimilarity of policies 105 to each other to create dissimilarity matrix. In the present embodiment, one may assign policies 105 to points on a grid 100 using any method that attempts to associate policies 105 with small dissimilarity according to dissimilarity matrix in nearby grid 100 locations in a step 320. A non-limiting example of step 320 may be shown in FIG. 4. In the present embodiment, system may check whether policies 105 may have been changed by updating or adaption in an optional step 325. If policy 105 has been changed, one may repeat process from step 315. Step 320 may take into account the policy's previous coordinates when assigning new coordinates. If policy 105 has not been changed, system may re-check for changes.

Figure 4:
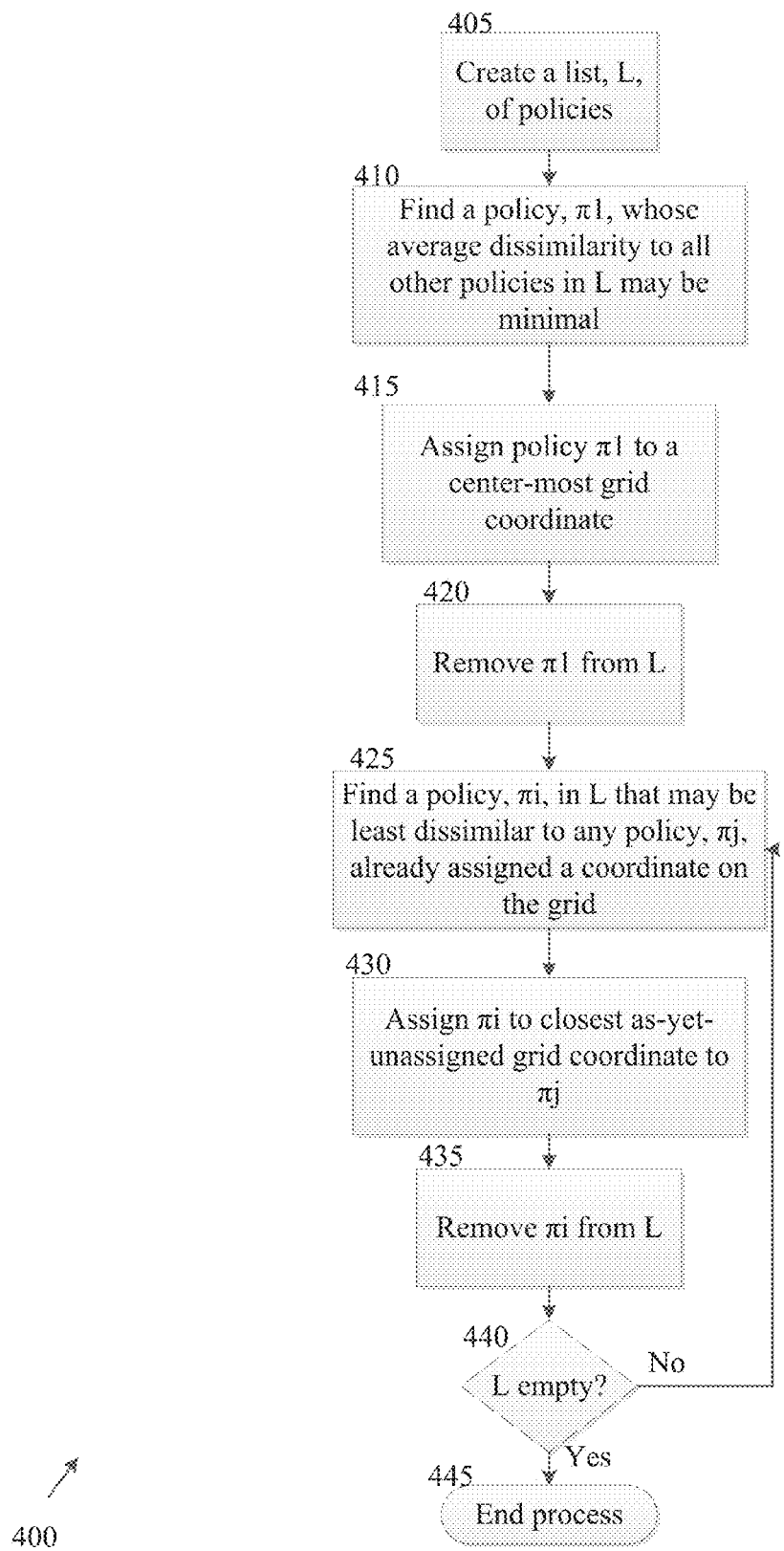
FIG. 4 illustrates an exemplary method for associating policies 105 with a coordinate 110 in a policy manifold having the topology of a discrete grid 100, in accordance with an embodiment of the present invention.

FIG. 4 illustrates an exemplary method for associating policies 105 with a coordinate 110 in a policy manifold laid out as a discrete grid 100, in accordance with an embodiment of the present invention. In the present embodiment, one may create a list, L, of policies 105 in a step 405. Further, in the present embodiment, one may find a policy, $\pi 1$, in L whose average dissimilarity to all other policies 105 in L may be minimal in a step 410. In some embodiments, dissimilarity between policies 105 may be computed between all pairs of policies 105 and stored in a dissimilarity matrix. In the present embodiment, one may assign $\pi 1$ to a center-most grid 100 coordinate in a step 415.

Further, in the present embodiment, one may remove $\pi 1$ from L in a step 420. Still further, in the present embodiment, one may find a policy, $\pi i$, in L that may be least dissimilar to any policy 105, $\pi j$, which may have already been assigned a coordinate 110 Cj on grid 100 in a step 425. Further, in the present embodiment, one may assign $\pi i$ to an as-yet-unassigned grid 100 coordinate 110 Ci which may be closest to Cj in a step 430. Still further, in the present embodiment, one may remove $\lambda i$ from L in a step 435. Still further, in the present embodiment, one may determine whether L may be empty of policies 105 in a step 440. If L is not empty, process may be repeated from step 425. If L is empty, process may conclude in a step 445.

Figure 5:
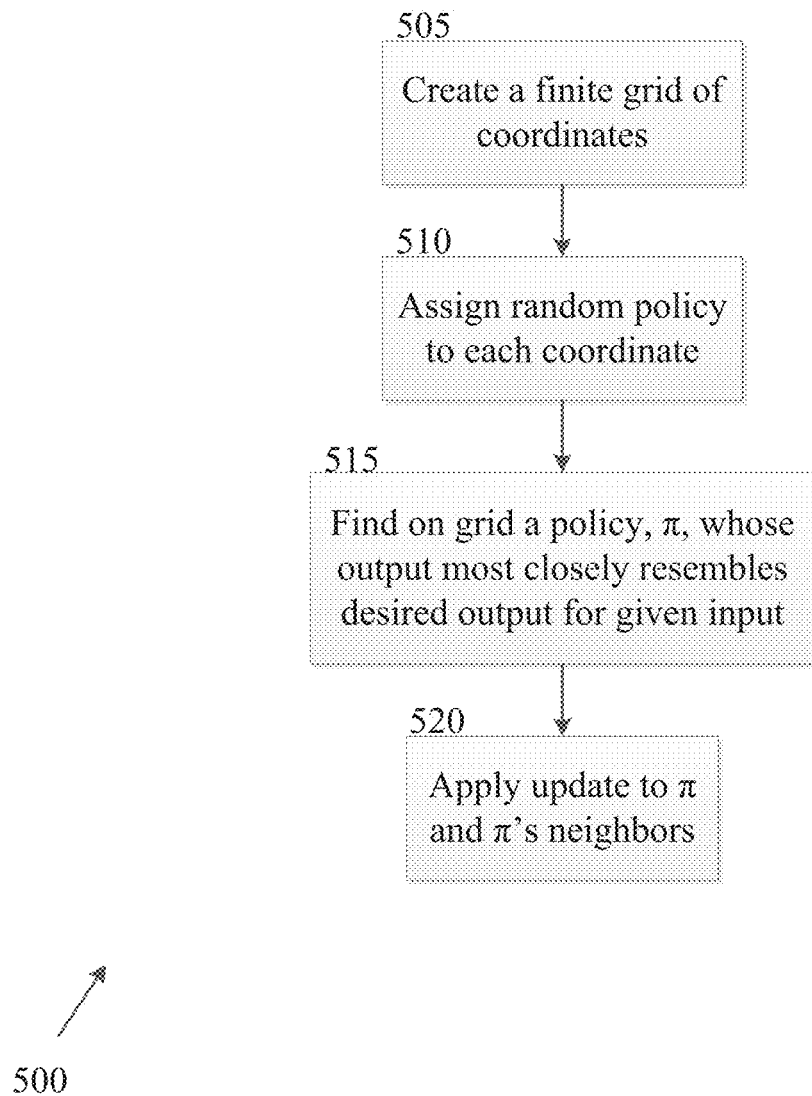
FIG. 5 illustrates an exemplary method for applying updates to policies 105, in accordance with an embodiment of the present invention.

FIG. 5 illustrates an exemplary method for applying updates to policies 105, in accordance with an embodiment of the present invention. In the present embodiment, one may create a policy manifold laid out as a discrete, finite grid 100 of coordinates 110 in/on a surface in a step 505. In some embodiments, coordinates 110 may be evenly spaced. In the present embodiment, one may assign a random policy 105 to each coordinate 110 in a step 510. In some embodiments, one may update policies 105 through a process represented in steps 515 and 520 in the present embodiment which steps may be repeated as required potentially indefinitely. In the present embodiment, one may find a policy 105, $\pi$, on the grid 100, $\pi$ possibly having output most similar to (according to a chosen metric) a desired output for any given input in a step 515. Further, in the present embodiment, one may apply an update to π and/or π's neighbors (according to π's coordinate within grid 100) determined as a non-limiting example as lying within a predetermined or variable radius of π's coordinate 110, or as another non-limiting example, the update may be applied to each neighbor to a degree that depends on the neighbor's distance to π's coordinate 110. In a step 525 steps 515 and 520 are repeated as required potentially indefinitely.

Figure 6:
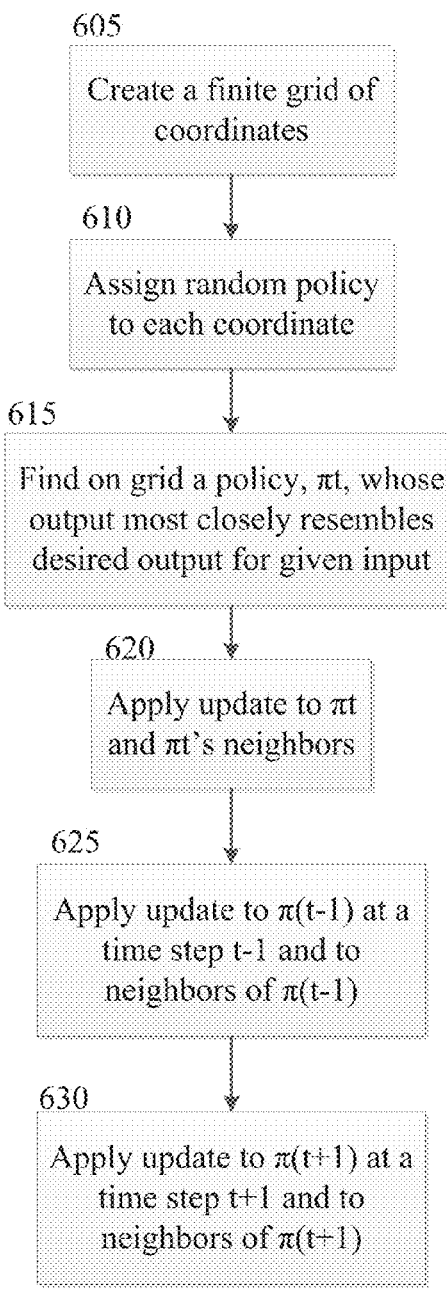
FIG. 6 illustrates another exemplary method for applying updates to policies 105, in accordance with an embodiment of the present invention.

FIG. 6 illustrates another exemplary method for applying updates to policies 105, in accordance with an embodiment of the present invention. In the present embodiment, one may create a policy manifold laid out as a discrete, finite grid 100 of coordinates 110 in/on surface in a step 605. In some embodiments, coordinates 110 may be evenly spaced. In the present embodiment, one may assign a random policy 105 to each coordinate 110 in a step 610, thus forming a policy manifold. In some embodiments, one may update policies in the policy manifold through a process represented in steps 615, 620, 625, and 630. In the present embodiment, one may find a policy, πt, possibly having an output similar to (according to a chosen metric) a desired output for a given input in a step 615. Further, in the present embodiment, one may apply an update to πt and/or any of πt's neighbors (possibly according to πt's coordinates 110 in policy manifold) as a non-limiting example within a determined or variable radius of a coordinate 110 in a step 620, or as another non-limiting example the update may be applied to each neighbor to a degree that depends on the neighbor's distance to πt's coordinate 110. Still further, in the present embodiment, one may apply an update to a policy 105, π(t−1), which may have been found in step 615 at a time step t−1 and to any neighbors of π(t−1) in an optional step 625, possibly to a degree that depends on the neighbor's distance to π(t−1)'s coordinate 110. Further, in the present embodiment, one may apply an update to a policy 105, π(t+1) which may have been found in step 615 at a time step t+1 and to any neighbors of π(t+1) in an optional step 630, possibly to a degree that depends on the neighbor's distance to π(t+1)'s coordinate 110.

In some embodiments, an agent may or may not be given a goal to achieve and/or reinforcements such that the agent's task may be to increase or maximize the value of the reinforcements it receives or to optimize a particular measure.

Some embodiments of the present invention may be used as a primary component of learning or one of many components. A few embodiments may be stacked or layered such that inputs received may be outputs from other components. In a non-limiting example, outputs from one component may be action information which may be fed to another component as state information, an agent's final action possibly being decided by an arbitration mechanism that may combine outputs within one or among multiple components.

In some instances, responsibilities pertaining to various components of embodiments of the present invention may be performed by multiple different entities. In a non-limiting example, partial or complete organization of policies 105 may be performed offline by a learning process located on a computer in a foreign country, while a domestic intelligent agent may be an ultimate beneficiary of the learning. Such transfer may occur in real-time, with ongoing updates or as a one-time transfer of information.

In some embodiments the functionality of the working system may be distributed at fine granularity across a large number of computing devices such that each may perform only a small part of the operations of the system (such as without limitation the storage and/or update of a single policy or even of a single parameter or weight in a function approximator within a single policy) yet in combination effecting the means or methods constituting the spirit of the invention.

In some embodiments, all or some observations and/or actions may be associated with coordinates or coordinate ranges in the policy manifold such that only those policies whose coordinates overlap with said observation/action coordinates or coordinate ranges are allowed to access said observations and/or actions.

In a non-limiting example, a policy manifold may be used in the control of any limbed robot with any number of sensory and action modalities and dimensions. In the present non-limiting example, policies 105 may dictate or describe the behavior of limbs of a robot, including joints, while moving through physical space and/or while forming a trajectory through a complete sensorimotor space, i.e., space formed by entirety of agent's sensors and/or actions. Further, in the present non-limiting example, a "limb" may be any movable element, such as, without limitation, a servo, a motor, an engine torque or throttle, a flight surface, a pressure valve, and anything else having a range of motion which may be controlled by electronic means.

In some embodiments, a "sensor" may include, without limitation, any source of information about an agent's environment, and, more particularly, how a control may be directed toward reaching an end. In a non-limiting example, sensory information may come from any source, including, without limitation, sensory devices, such as cameras, touch sensors, range sensors, temperature sensors, wavelength sensors, sound or speech sensors, proprioceptive sensors, position sensors, pressure or force sensors, velocity or acceleration or other motion sensors, etc., or from compiled, abstract, or situational information (e.g. known position of an object in a space) which may be compiled from a collection of sensory devices combined with previously held information (e.g. regarding recent positions of an object), location information, location sensors, etc.

In many embodiments, a "movable element" may be further expanded to any controllable process, such as, without limitation, chemical concentration, voltage, fluid pressure, website linkage, product pricing or placement, sending of emails, etc.

In other embodiments, "any source of information" may include, without limitation, any information about an internal state of a plant, information about a learning system itself, including a policy 105 manifold itself, or the actions selected by a policy within a policy manifold, or of any part of an environment which an agent may or may not be able to influence, such as, without limitation, chemical concentration, voltage, pressure, or a potential customer's buying habits, focus of attention, or likelihood to respond in a given way.

As a non-limiting example, the agent may control a robot where the sensors of the robot provide some or all state information for the policies, and the actions available to the agent are the controls of the actuators of the robot. The robot agent may be given, or may learn through interaction with its environment using its sensors and actuators, a repertoire or library of behaviors organized into one or more components of the form described in this Application such that each policy in the library or repertoire of stored behaviors has a corresponding coordinate in one or more of said embodiments/components.

In another non-limiting example, one or more embodiments already instantiated as a component in an agent may (or may not) be frozen (such that no more learning updates are performed) while the organization of the policies in the policy manifold is exploited to increase the performance of the agent.

In another non-limiting example, the embodiment provides one component of an intelligent agent that controls a simulated player or character in a video game or virtual reality and uses its repertoire of policies to interact with other players or characters, human or artificial, of the video game or virtual reality.

In another non-limiting example, the sensors provide chemical concentration or flow-rate information of a chemical plant and the actions control actuators that influence said concentrations or flow rates.

In another non-limiting example, the sensors may provide information about web-site visitors' or customers' buying habits and the actions may describe methods for interacting with said customers, such as displaying advertisement or sending email.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 7:
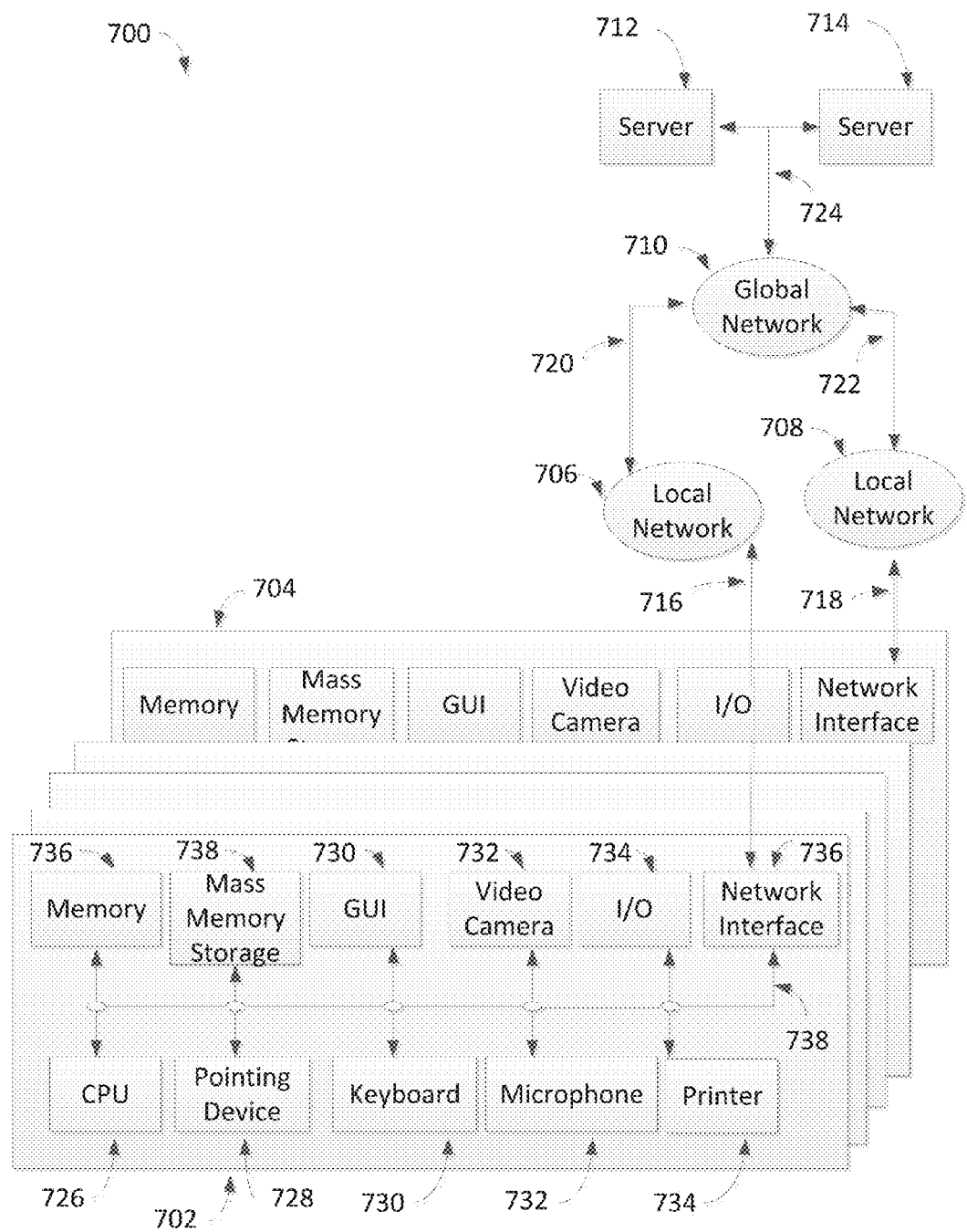
FIG. 7 is a block diagram depicting an exemplary client/server system which may be used by an exemplary web-enabled/networked embodiment of the present invention.

FIG. 7 is a block diagram depicting an exemplary client/server system which may be used by an exemplary web-enabled/networked embodiment of the present invention.

A communication system 700 includes a multiplicity of clients with a sampling of clients denoted as a client 702 and a client 704, a multiplicity of local networks with a sampling of networks denoted as a local network 706 and a local network 708, a global network 710 and a multiplicity of servers with a sampling of servers denoted as a server 712 and a server 714.

Client 702 may communicate bi-directionally with local network 706 via a communication channel 716. Client 704 may communicate bi-directionally with local network 708 via a communication channel 718. Local network 706 may communicate bi-directionally with global network 710 via a communication channel 720. Local network 708 may communicate bi-directionally with global network 710 via a communication channel 722. Global network 710 may communicate bi-directionally with server 712 and server 714 via a communication channel 724. Server 712 and server 714 may communicate bi-directionally with each other via communication channel 724. Furthermore, clients 702, 704, local networks 706, 708, global network 710 and servers 712, 714 may each communicate bi-directionally with each other.

In one embodiment, global network 710 may operate as the Internet. It will be understood by those skilled in the art that communication system 700 may take many different forms. Non-limiting examples of forms for communication system 700 include local area networks (LANs), wide area networks (WANs), wired telephone networks, wireless networks, or any other network supporting data communication between respective entities.

Clients 702 and 704 may take many different forms. Non-limiting examples of clients 702 and 704 include personal computers, personal digital assistants (PDAs), cellular phones and smartphones.

Client 702 includes a CPU 726, a pointing device 728, a keyboard 730, a microphone 732, a printer 734, a memory 736, a mass memory storage 738, a GUI 740, a video camera 742, an input/output interface 744 and a network interface 746.

CPU 726, pointing device 728, keyboard 730, microphone 732, printer 734, memory 736, mass memory storage 738, GUI 740, video camera 742, input/output interface 744 and network interface 746 may communicate in a unidirectional manner or a bi-directional manner with each other via a communication channel 748. Communication channel 748 may be configured as a single communication channel or a multiplicity of communication channels.

CPU 726 may be comprised of a single processor or multiple processors. CPU 726 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 736 is used typically to transfer data and instructions to CPU 726 in a bi-directional manner. Memory 736, as discussed previously, may include any suitable computer-readable media, intended for data storage, such as those described above excluding any wired or wireless transmissions unless specifically noted. Mass memory storage 738 may also be coupled bi-directionally to CPU 726 and provides additional data storage capacity and may include any of the computer-readable media described above. Mass memory storage 738 may be used to store programs, data and the like and is typically a secondary storage medium such as a hard disk. It will be appreciated that the information retained within mass memory storage 738, may, in appropriate cases, be incorporated in standard fashion as part of memory 736 as virtual memory.

CPU 726 may be coupled to GUI 740. GUI 740 enables a user to view the operation of computer operating system and software. CPU 726 may be coupled to pointing device 728. Non-limiting examples of pointing device 728 include computer mouse, trackball and touchpad. Pointing device 728 enables a user with the capability to maneuver a computer cursor about the viewing area of GUI 740 and select areas or features in the viewing area of GUI 740. CPU 726 may be coupled to keyboard 730. Keyboard 730 enables a user with the capability to input alphanumeric textual information to CPU 726. CPU 726 may be coupled to microphone 732. Microphone 732 enables audio produced by a user to be recorded, processed and communicated by CPU 726. CPU 726 may be connected to printer 734. Printer 734 enables a user with the capability to print information to a sheet of paper. CPU 726 may be connected to video camera 742. Video camera 742 enables video produced or captured by user to be recorded, processed and communicated by CPU 726.

CPU 726 may also be coupled to input/output interface 744 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 726 optionally may be coupled to network interface 746 which enables communication with an external device such as a database or a computer or telecommunications or internet network using an external connection shown generally as communication channel 716, which may be implemented as a hardwired or wireless communications link using suitable conventional technologies. With such a connection, CPU 726 might receive information from the network, or might output information to a network in the course of performing the method steps described in the teachings of the present invention.

Figure 8:
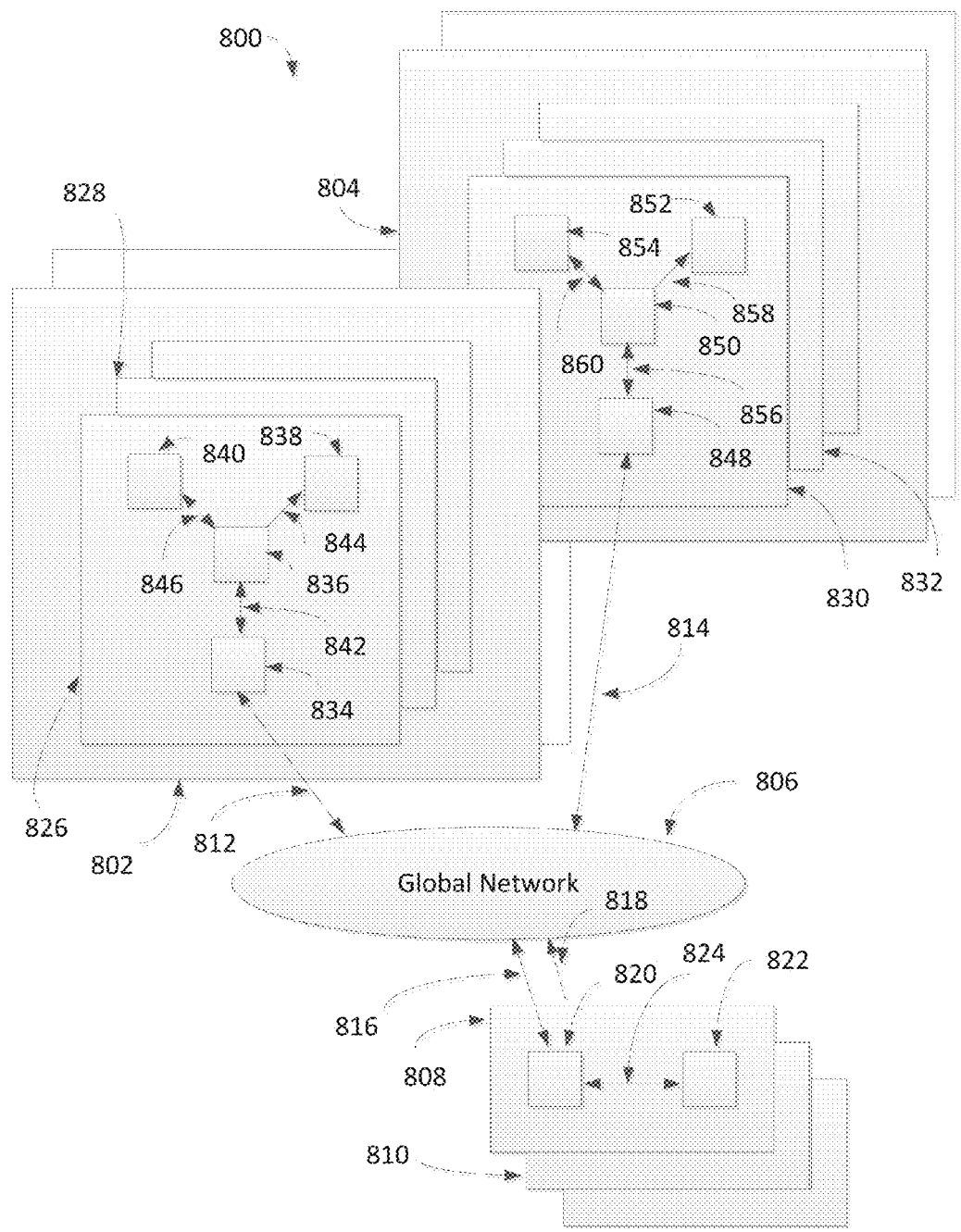
FIG. 8 illustrates a block diagram depicting a conventional client/server communication system.

FIG. 8 illustrates a block diagram depicting a conventional client/server communication system.

A communication system 800 includes a multiplicity of networked regions with a sampling of regions denoted as a network region 802 and a network region 804, a global network 806 and a multiplicity of servers with a sampling of servers denoted as a server device 808 and a server device 810.

Network region 802 and network region 804 may operate to represent a network contained within a geographical area or region. Non-limiting examples of representations for the geographical areas for the networked regions may include postal zip codes, telephone area codes, states, counties, cities and countries. Elements within network region 802 and 804 may operate to communicate with external elements within other networked regions or within elements contained within the same network region.

In some implementations, global network 806 may operate as the Internet. It will be understood by those skilled in the art that communication system 800 may take many different forms. Non-limiting examples of forms for communication system 800 include local area networks (LANs), wide area networks (WANs), wired telephone networks, cellular telephone networks or any other network supporting data communication between respective entities via hardwired or wireless communication networks. Global network 806 may operate to transfer information between the various networked elements.

Server device 808 and server device 810 may operate to execute software instructions, store information, support database operations and communicate with other networked elements. Non-limiting examples of software and scripting languages which may be executed on server device 808 and server device 810 include C, C++, C# and Java.

Network region 802 may operate to communicate bi-directionally with global network 806 via a communication channel 812. Network region 804 may operate to communicate bi-directionally with global network 806 via a communication channel 814. Server device 808 may operate to communicate bi-directionally with global network 806 via a communication channel 816. Server device 810 may operate to communicate bi-directionally with global network 806 via a communication channel 818. Network region 802 and 804, global network 806 and server devices 808 and 810 may operate to communicate with each other and with every other networked device located within communication system 800.

Server device 808 includes a networking device 820 and a server 822. Networking device 820 may operate to communicate bi-directionally with global network 806 via communication channel 816 and with server 822 via a communication channel 824. Server 822 may operate to execute software instructions and store information.

Network region 802 includes a multiplicity of clients with a sampling denoted as a client 826 and a client 828. Client 826 includes a networking device 834, a processor 836, a GUI 838 and an interface device 840. Non-limiting examples of devices for GUI 838 include monitors, televisions, cellular telephones, smartphones and PDAs (Personal Digital Assistants). Non-limiting examples of interface device 840 include pointing device, mouse, trackball, scanner and printer. Networking device 834 may communicate bi-directionally with global network 806 via communication channel 812 and with processor 836 via a communication channel 842. GUI 838 may receive information from processor 836 via a communication channel 844 for presentation to a user for viewing. Interface device 840 may operate to send control information to processor 836 and to receive information from processor 836 via a communication channel 846. Network region 804 includes a multiplicity of clients with a sampling denoted as a client 830 and a client 832. Client 830 includes a networking device 848, a processor 850, a GUI 852 and an interface device 854. Non-limiting examples of devices for GUI 838 include monitors, televisions, cellular telephones, smartphones and PDAs (Personal Digital Assistants). Non-limiting examples of interface device 840 include pointing devices, mousse, trackballs, scanners and printers. Networking device 848 may communicate bi-directionally with global network 806 via communication channel 814 and with processor 850 via a communication channel 856. GUI 852 may receive information from processor 850 via a communication channel 858 for presentation to a user for viewing. Interface device 854 may operate to send control information to processor 850 and to receive information from processor 850 via a communication channel 860.

For example, consider the case where a user interfacing with client 826 may want to execute a networked application. A user may enter the IP (Internet Protocol) address for the networked application using interface device 840. The IP address information may be communicated to processor 836 via communication channel 846. Processor 836 may then communicate the IP address information to networking device 834 via communication channel 842. Networking device 834 may then communicate the IP address information to global network 806 via communication channel 812. Global network 806 may then communicate the IP address information to networking device 820 of server device 808 via communication channel 816. Networking device 820 may then communicate the IP address information to server 822 via communication channel 824. Server 822 may receive the IP address information and after processing the IP address information may communicate return information to networking device 820 via communication channel 824. Networking device 820 may communicate the return information to global network 806 via communication channel 816. Global network 806 may communicate the return information to networking device 834 via communication channel 812. Networking device 834 may communicate the return information to processor 836 via communication channel 842. Processor 846 may communicate the return information to GUI 838 via communication channel 844. User may then view the return information on GUI 838.

Figure 9:
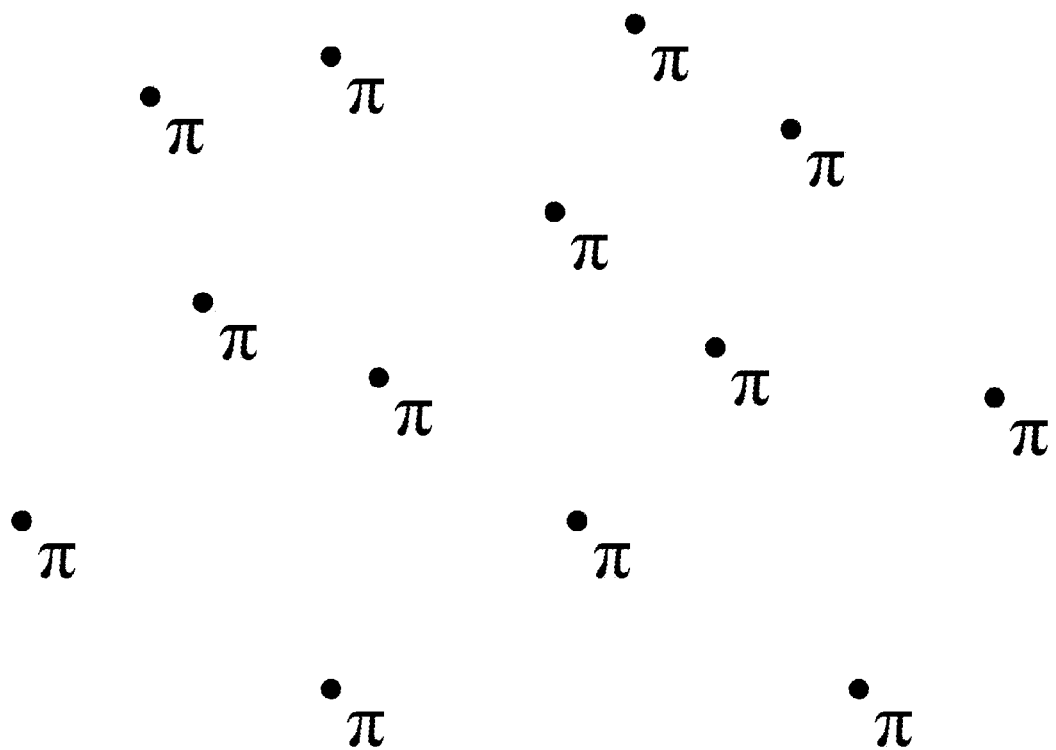
FIG. 9 illustrates an exemplary 2D policy manifold, in accordance with an embodiment of the present invention.

FIG. 9 illustrates an exemplary 2D policy manifold, in accordance with an embodiment of the present invention.

Figure 10:
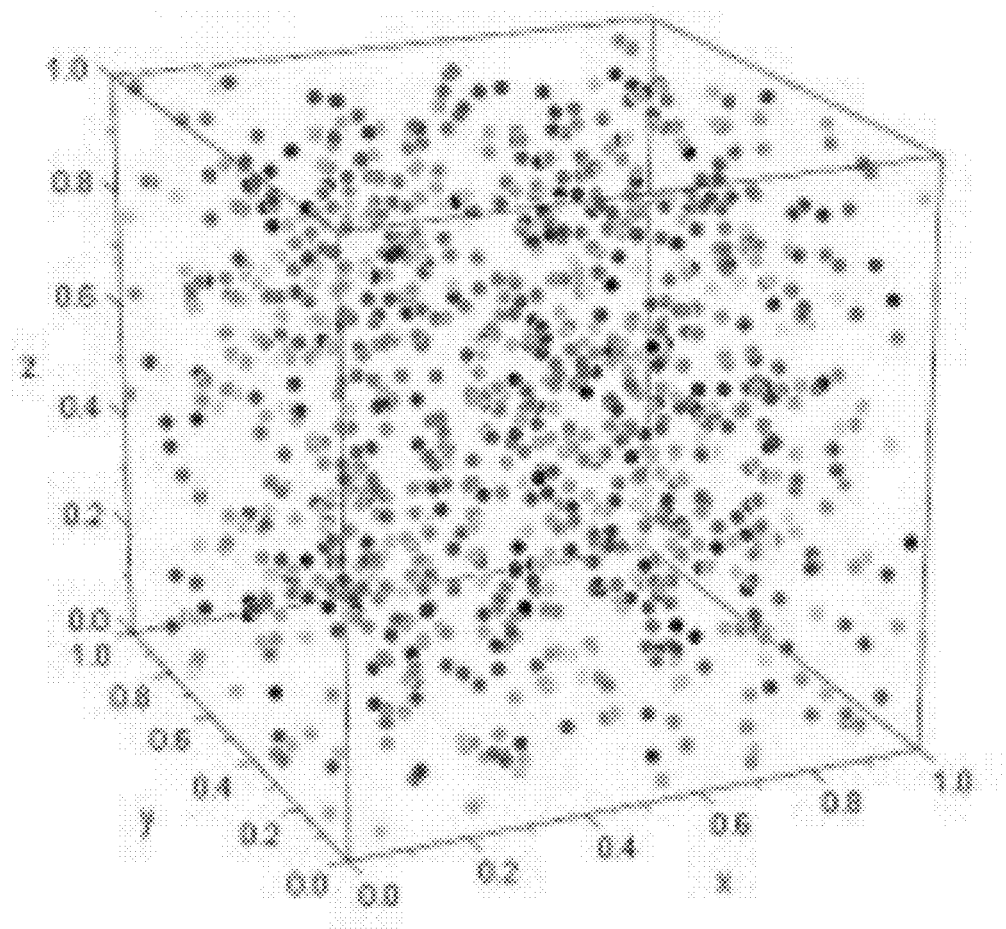
FIG. 10 illustrates an exemplary 3D policy manifold space, in accordance with an embodiment of the present invention.

FIG. 10 illustrates an exemplary 3D policy manifold space, in accordance with an embodiment of the present invention.

Figure 11:
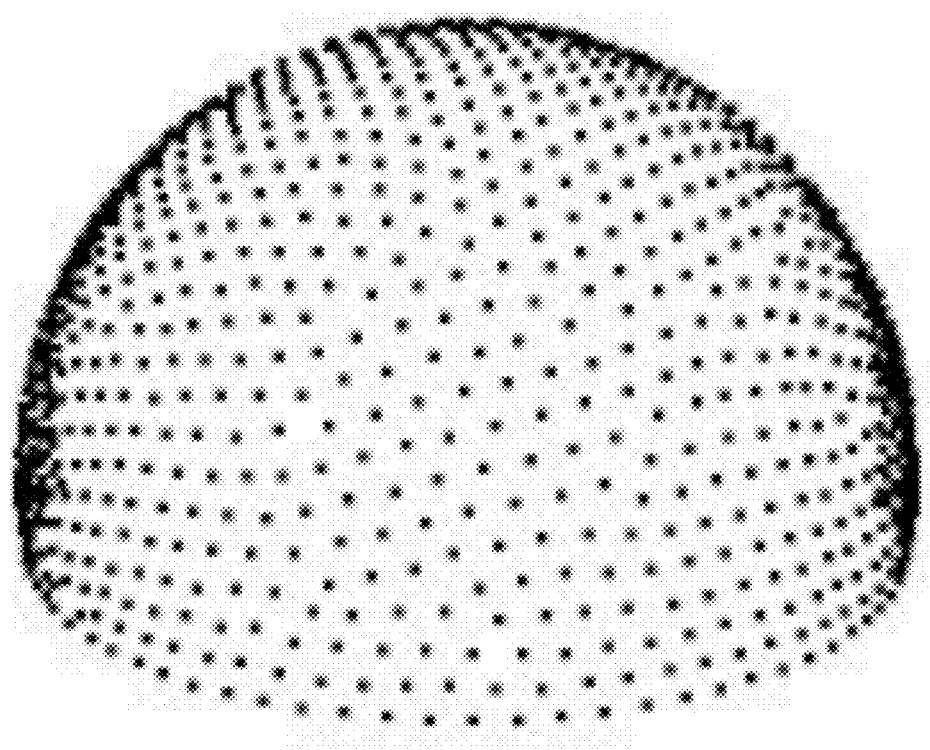
FIG. 11 illustrates an exemplary hemisphere-shaped policy manifold, in accordance with an embodiment of the present invention.

FIG. 11 illustrates an exemplary hemisphere-shaped policy manifold, in accordance with an embodiment of the present invention.

Figure 12:
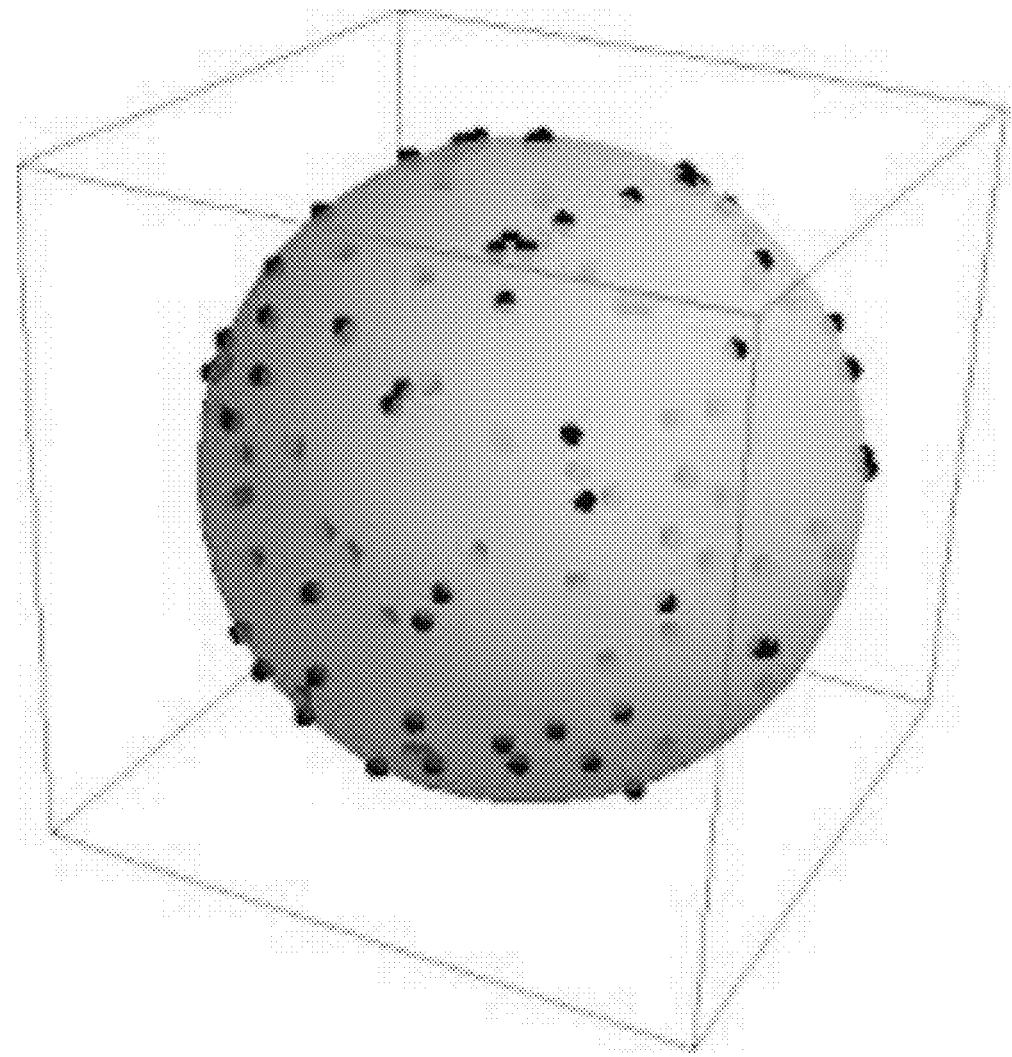
FIG. 12 illustrates an exemplary sphere-shaped policy manifold, in accordance with an embodiment of the present invention.

FIG. 12 illustrates an exemplary sphere-shaped policy manifold, in accordance with an embodiment of the present invention.

Figure 13:
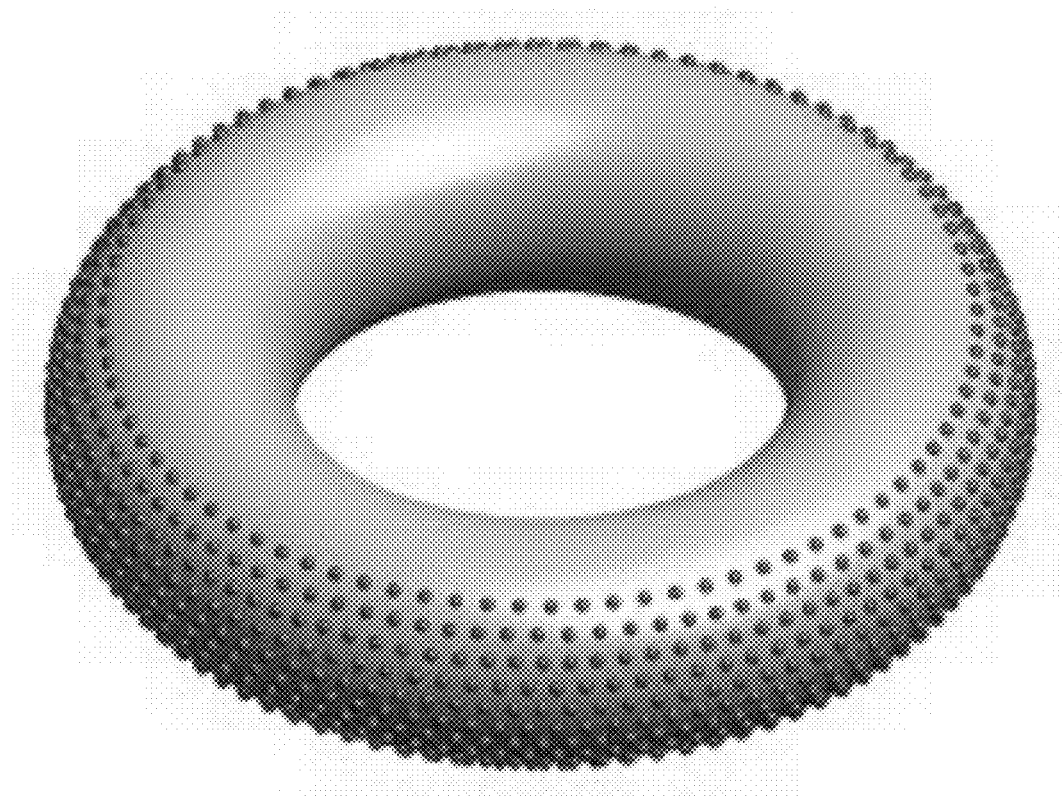
FIG. 13 illustrates an exemplary torus-shaped policy manifold, in accordance with an embodiment of the present invention.

FIG. 13 illustrates an exemplary torus-shaped policy manifold, in accordance with an embodiment of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing intelligent artificial agents according to the present invention will be apparent to those skilled in the art. Various aspects of the invention have been described above by way of illustration, and the specific embodiments disclosed are not intended to limit the invention to the particular forms disclosed. The particular implementation of the intelligent artificial agents may vary depending upon the particular context or application. By way of example, and not limitation, the intelligent artificial agents described in the foregoing were principally directed to two-dimensional implementations; however, similar techniques may instead be applied to higher-dimension implementation, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(*b*) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for mapping states and actions of an intelligent artificial agent, the method comprising the steps of:
    creating, by said at least one or more processors, at least a policy defining a behavior of said intelligent artificial agent, said policy comprising a set of policies for said intelligent artificial agent, each of said policies comprising at least a full or partial agent state information for mapping to an agent's action;
    creating a policy manifold, said policy manifold comprising a point on a surface associated with a policy, said surface comprising a set of surface points where each of said surface point is associated with each of said policies, said policy manifold further comprising at least a policy coordinate for each of said surface points;
    associating each of said policies to said policy coordinate on said policy manifold;
    organizing the policy coordinates of said policy manifold based on a property and distance of each of said policies on said policy manifold, wherein distances between policy coordinates are configured to reflect policy dissimilarities among each of said policies;
    comparing actions produced by each policy having the same state information to determine dissimilarity between neighboring policies;
    applying a learning update to the coordinates of at least one of said policies having dissimilarities among neighboring policies, said learning update being configured to modify said policy coordinate to have a shorter distance to policies with lesser dissimilarities, wherein said policy manifold is configured to show greater smoothness when dissimilarity between policies is smaller between policies whose coordinates in the policy manifold have a shorter distance.

2. The method as recited in claim 1, further comprising the step of assigning similar policies to neighboring coordinates to help provide a smoothness to said policy manifold, wherein said policy manifold is less smoother if said neighboring policies are more similar to distant policies than said updated policies.

3. The method as recited in claim 2, in which said distance between policy coordinates corresponds to a degree of dissimilarity between the associated policies.

4. The method as recited in claim 3, in which an input and an outputs of said policy are associated with said policy coordinates in the policy manifold, and only policies whose coordinates overlap with said input and said output coordinates are allowed to access said input and said outputs.

5. The method as recited in claim 1, further comprising the step of applying an update to at least one neighboring policy coordinate of a modified policy coordinate of said policy manifold, wherein the policy manifold is smoother if policies of neighboring policy coordinates of said modified policy coordinate is more similar to policies of said modified policy coordinates than distant policies.

6. The method as recited in claim 5, further comprising the step of organizing at least one policy in a policy manifold according to a property of said at least one policy or a topology of said policy manifold.

7. The method as recited in claim 5, further comprising the step of repeating the steps of creating a policy defining a behavior of said intelligent artificial agent and assigning similar policy coordinates subsequent to the step of applying said learning update.

8. The method as recited in claim 5, in which said at least one or more processors generating a dissimilarity matrix between at least a pair of said policies, and said policy coordinate is at least in part determined by said dissimilarity matrix.

9. The method as recited in claim 1, further comprising the step of generating a grid pattern for said coordinates, said policy further comprising a starting condition when said policy may begin or continue, said policy further comprising a termination condition when said policy may terminate.

10. A system comprising:
one or more processing units being configured to assemble a set of policies for an intelligent artificial agent, each of said policies at least comprising information for mapping state or sensory information as input to action preferences as output;
said one or more processing units being further configured to implement said set of policies in a table, wherein table entries represent a probability of choosing said action preferences given said state and sensory information;
said one or more processing units being further configured to generate a dissimilarity matrix between at least a pair of said policies;
said one or more processing units being further configured to assign each of said policies a policy coordinate on a policy manifold, said policy coordinate being at least in part determined by said dissimilarity matrix, said policy manifold comprising a dimensionality being lower than a combined dimensionality of said input and said output, wherein said policy manifold at least in part determines a behavior of the intelligent artificial agent;
said one or more processing units being further configured to organize the policies of said policy manifold based on a property and distance of each of said policies on said policy manifold, wherein distances between policies in the policy manifold are configured to reflect policy dissimilarities among each of said policies;
a source of information data, said information data source comprising a device, said information data comprising said policy manifold of said device, wherein a learning update is applied to a policy of said policy manifold to produce policies with less dissimilarities;
a sensory device, said sensory device is configured to receive said information data of said device; and
said one or more processing units being further configured to apply an update to neighboring policies of said updated policy, and to repeat the process to generate a dissimilarity matrix and assign policy coordinates subsequent to the applied update, in which policies having similar output for similar input are assigned neighboring coordinates to provide a smoothness to said policy manifold and a distance between policy coordinates corresponds to a degree of dissimilarity between the associated policies, said inputs and said outputs are associated with coordinates or coordinate ranges in the policy manifold, and only policies whose coordinates overlap with said input and said output coordinates or coordinate ranges are allowed to access said inputs and said outputs.

11. The system as recited in claim 10, said one or more processing units being further configured to be operable to generate a grid pattern for said coordinates.

12. A non-transitory computer-readable storage medium with an executable program stored thereon, wherein the program instructs one or more processors to perform the following steps:
assembling a set of policies, for an intelligent artificial agent, each of said policies at least comprising information for mapping state or sensory information as input to action preferences as output;
creating a policy manifold, said policy manifold comprising a point on a surface, said surface comprising a set of surface points associated with each of said policies, said policy manifold further comprising at least a policy coordinate for each of said surface points;
generating a dissimilarity matrix between said policies;
assigning each of said policies a policy coordinate on said policy manifold, said policy coordinate being at least in part determined by said dissimilarity matrix, said policy manifold comprising a dimensionality being lower than a combined dimensionality of said input and said output, wherein said policy manifold at least in part determines a behavior of the intelligent artificial agent;
organizing the policies of said policy manifold based on a property and distance of each of said policies on said policy manifold, wherein distances between policies in the policy manifold are configured to reflect policy dissimilarities among each of said policies;
applying a learning update to the coordinates of at least one of said policies having dissimilarities among neighboring policies, said learning update being configured to modify said policy coordinate to have a shorter distance to policies with lesser dissimilarities, wherein said policy manifold is configured to show greater smoothness when dissimilarity between policies is smaller between policies whose coordinates in the policy manifold have a shorter distance.

13. The program instructing the processor as recited in claim 12, in which similar policies are assigned neighboring coordinates to provide a smoothness to said policy manifold, and a distance between policy coordinates corresponds to a degree of dissimilarity between the associated policies.

14. The program instructing the processor as recited in claim 13, in which said input and said outputs are associated with coordinates or coordinate ranges in the policy manifold, and only policies whose coordinates overlap with said input and said output coordinates or coordinate ranges are allowed to access said input and said outputs.

15. The program instructing the processor as recited in claim 12, in which said update is a result of a learning process of a neural network.

16. The program instructing the processor as recited in claim 12, further comprising the step of generating a grid pattern for said updated policy coordinates.

* * * * *